(12) United States Patent
Baldwin

(10) Patent No.: US 8,187,139 B2
(45) Date of Patent: May 29, 2012

(54) PLANETARY KINEMATIC ARRANGEMENT SUITABLE FOR IDLE ENGINE STOP

(75) Inventor: Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 610 days.

(21) Appl. No.: 12/366,708

(22) Filed: Feb. 6, 2009

(65) Prior Publication Data

US 2010/0203997 A1 Aug. 12, 2010

(51) Int. Cl.
*F16H 3/44* (2006.01)
(52) U.S. Cl. .......................... 475/286; 475/288
(58) Field of Classification Search ........... 475/286–288
See application file for complete search history.

(56) References Cited

U.S. PATENT DOCUMENTS

| | | | |
|---|---|---|---|
| 4,046,031 A | 9/1977 | Ott et al. | |
| 4,070,927 A | 1/1978 | Polak | |
| 4,683,776 A | 8/1987 | Klemen | |
| 5,295,924 A | 3/1994 | Beim | |
| 6,547,688 B2 | 4/2003 | Takagi et al. | |
| 6,723,019 B2 | 4/2004 | Lee et al. | |
| 6,802,795 B2 | 10/2004 | Miyazaki et al. | |
| 7,163,484 B2 | 1/2007 | Klemen | |
| 7,276,011 B2 | 10/2007 | Tabata et al. | |
| 7,503,438 B2 * | 3/2009 | Renner et al. | 188/161 |
| 7,597,646 B2 * | 10/2009 | Kamm et al. | 475/277 |
| 2007/0072732 A1 | 3/2007 | Klemen | |
| 2007/0259753 A1 | 11/2007 | Diosi et al. | |
| 2007/0270276 A1 * | 11/2007 | Kamm et al. | 475/282 |

* cited by examiner

*Primary Examiner* — Justin Holmes
(74) *Attorney, Agent, or Firm* — David B. Kelley; Brooks Kushman, P.C.

(57) ABSTRACT

A multiple speed power transmission, comprising: a gearbox input shaft; an output shaft; and a collection of gears, friction clutches, and passive couplers capable of transmitting power from the gearbox input shaft to the output shaft with eight forward speed ratios and one reverse speed ratio wherein the first forward speed ratio is selected by engaging friction brakes using electromechanical actuators.

16 Claims, 5 Drawing Sheets

| Gear Number | Description | Number of teeth |
|---|---|---|
| 22 | 1st Sun | 26 |
| 24 | 1st Ring | 76 |
| 28 | 1st Planet | 25 |
| 32 | 2nd Sun | 42 |
| 34 | 2nd Ring | 92 |
| 38 | 2nd Planet | 25 |
| 42 | 3rd Sun | 29 |
| 44 | 3rd Ring | 83 |
| 48 | 3rd Planet | 27 |
| 52 | 4th Sun | 43 |
| 54 | 4th Ring | 79 |
| 58 | 4th Planet | 18 |

Fig. 2

| Ratio # | Clutch 60 | Clutch 62 | Brake 64 | Brake 68 | Brake 70 / OWC 66 | Speed Ratio | Step Size |
|---|---|---|---|---|---|---|---|
| Reverse | | | X | | X | -2.982 | 69% |
| 1st | | | | X | X | 4.305 | |
| 2nd | | | X | X | | 2.879 | 1.50 |
| 3rd | X | | | X | | 1.780 | 1.62 |
| 4th | | X | | X | | 1.349 | 1.32 |
| 5th | X | X | | | | 1.000 | 1.35 |
| 6th | | X | X | | | 0.892 | 1.12 |
| 7th | | X | | | X | 0.678 | 1.32 |
| 8th | X | | X | | | 0.617 | 1.10 |

Fig. 3

| Ratio # | Clutch 60 | Clutch 100 | Clutch 102 | Brake 64 | Brake 68 | Brake 70 / OWC 66 | Speed Ratio | Step Size |
|---------|-----------|------------|------------|----------|----------|-------------------|-------------|-----------|
| Reverse |   |   | X | X |   |   | -2.982 |   |
| 1st     |   |   | (X) |   | X | X | 4.305 | 69% |
| 2nd     | X |   | X | X | X |   | 2.879 | 1.50 |
| 3rd     |   |   | (X) |   | X |   | 1.780 | 1.62 |
| 4th     |   | X | X |   | X |   | 1.349 | 1.32 |
| 5th     | X | X | X |   |   |   | 1.000 | 1.35 |
| 6th     |   | X |   | X |   |   | 0.892 | 1.12 |
| 7th     | X | X |   | X |   |   | 0.702 | 1.27 |
| 8th     | X |   | X | X |   |   | 0.617 | 1.14 |
| Alt     |   | X | X |   |   | X | 0.678 | 1.32 (from 6th) |

Fig. 5

PLANETARY KINEMATIC ARRANGEMENT SUITABLE FOR IDLE ENGINE STOP

BACKGROUND AND SUMMARY OF THE INVENTION

This invention relates to the field of automatic transmissions for motor vehicles. More particularly, the invention pertains to a kinematic arrangement of gearing, clutches, brakes, and the interconnections among them in a power transmission.

When a motor vehicle is stationary for a period of time, such as while waiting at a traffic light, it is desirable to shut off the engine to save fuel. The engine must then be quickly re-started when the driver signals that he is ready to move again, usually by removing his foot from the brake pedal and applying pressure to the accelerator pedal. If the delay in delivering torque to the drive wheels is excessive, the driver will be unsatisfied with the vehicle. In order to minimize the delay, it is important that the transmission be prepared to transmit torque in first gear as soon as the engine is running. Traditionally, an automatic transmissions is adapted for this idle engine stop feature by adding an electrically driven pump to provide hydraulic pressure to engage the appropriate friction elements.

This invention avoids the need for an electrically driven pump by employing electro-mechanical actuation for the friction elements used in first gear. Electro-mechanical actuation is operable when the engine is not running. However, electromechanical actuation is limited to friction elements on the periphery of the gearbox, such as brakes, whereas hydraulic actuation can be utilized for friction elements that are located under rotating shells. With the kinematic arrangement of this invention, only brakes need to be applied to engage first gear.

BRIEF DESCRIPTION OF THE DRAWINGS

FIG. 2 is a table showing proposed tooth numbers for each of the gears.

FIG. 3 is a table indicating the states of the clutches and resulting speed ratio of the transmission in FIG. 1 when the gears have the number of teeth indicated in FIG. 2.

FIG. 5 is a table indicating the states of the clutches and resulting speed ratio of the transmission in FIG. 4 when the gears have the number of teeth indicated in FIG. 2.

DETAILED DESCRIPTION OF THE INVENTION

Figure 1:
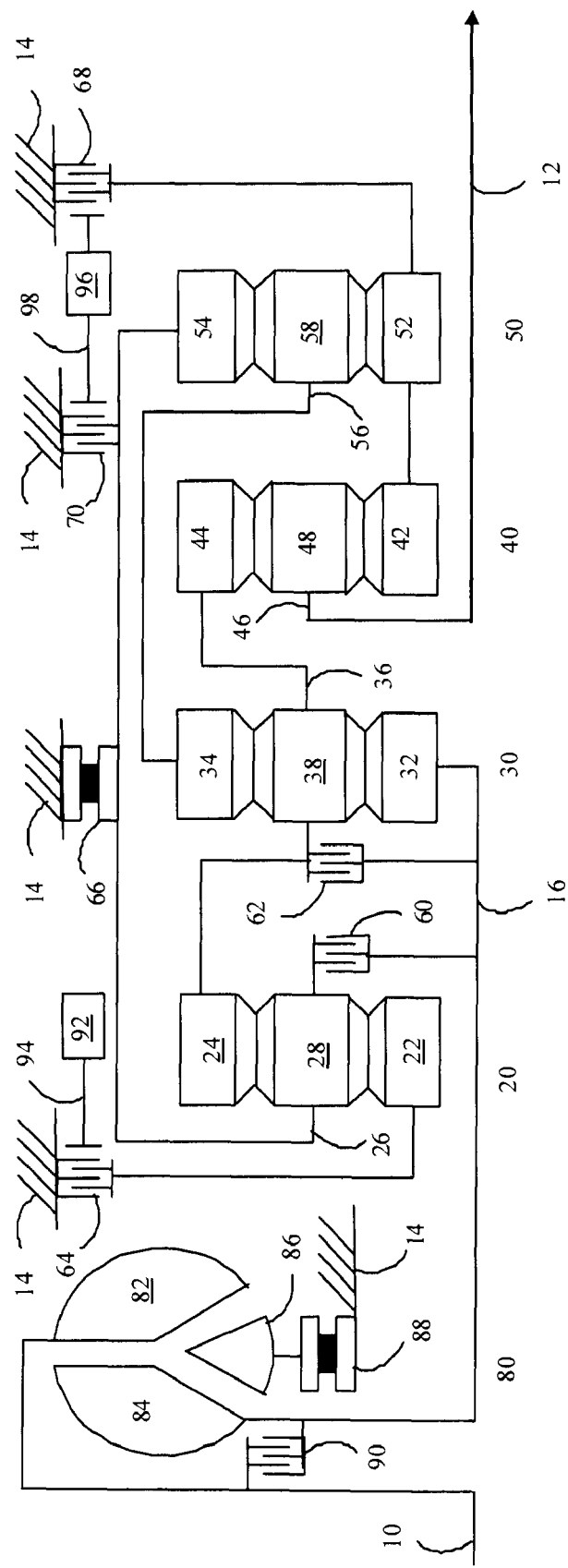
FIG. 1 is a schematic diagram of a transmission according to a first embodiment of the present invention having three brakes and two rotating clutches.

A transmission according to a first embodiment of the present invention is illustrated in FIG. 1. The transmission contains four simple planetary gear set assemblies 20, 30, 40, and 50. Each simple planetary gear set assembly has a sun gear, a ring gear with an internal mesh, a planet carrier, and a set of planet gears supported for rotation on the carrier and meshing with both the sun gear and ring gear. A recommended number of gear teeth for each of these gears is shown in FIG. 2. Simple planetary gear sets constrain the carrier to rotate at a speed that is a weighted average of the speeds of the sun gear and the ring gear, with the weighting factors determined by the respective number of gear teeth. Other types of epicyclic gearing assemblies, including double pinion planetary gear sets, stepped pinion planetary gear sets, and co-planar gear loops as describe in U.S. Pat. Nos. 5,030,184 and 6,126,566, offer alternative means of constraining the speed of an element to be the weighted average of the speeds of two other elements.

Gearbox input shaft 16 is driven by the vehicle's engine via torque converter assembly 80. The second sun gear 32 is fixed to gearbox input shaft 16. The first carrier 26 is connected to the fourth ring gear 54. The third sun gear 42 is connected to the fourth sun gear 52. The first ring gear 24, second carrier 36, and third ring gear 44 are mutually connected. A gearbox output shaft 12 drives the vehicle wheels, preferably via a driveshaft, a differential assembly, and rear axle shafts. Gearbox output shaft 12 is fixed to the third carrier 46. A transmission case 14 provides support for the gear sets, input shaft, and output shaft.

Clutches 60 and 62 are preferably hydraulically actuated friction clutches which releasably connect two elements when hydraulic pressure is applied and disconnect those elements when the hydraulic pressure is released. The hydraulic pressure is provided by an engine driven hydraulic pump and the pressurized fluid is distributed to the clutches via channels within gearbox input shaft 16. Clutch 60 releasably connects gearbox input shaft 16 to the first carrier 26 and fourth ring gear 54. Clutch 62 releasably connects gearbox input shaft 16 to the first ring gear 24, the second carrier 36, and the third ring gear 44. Clutch 62 forces all three elements of planetary gear set 30 to rotate at the same speed. This effect may alternatively be accomplished by a clutch releasably connecting any two of sun gear 32, carrier 36, and ring gear 34 to each other.

Brakes 64, 68, and 70 are preferably electro-mechanically actuated friction brakes which hold an element against rotation in response to the rotation of an electric motor and release said element when the electric motor is rotated in the opposite direction. U.S. Pat. No. 6,699,153 describes a number of suitable electro-mechanically actuated brake assemblies. Brake 64 releasably holds the first sun gear 22 against rotation. Brake 64 is applied by rotating motor 92 which moves piston 94 to create pressure on the friction plates. Brake 68 releasably holds the third sun gear 42 and fourth sun gear 52 against rotation. Brake 70 releasably holds the first carrier 26 and fourth ring gear 54 against rotation. Brakes 68 and 70 are applied by motor 96 and piston 98. Rotating motor 96 in one direction pushes piston 98 against brake 68 and rotating it in the opposite direction pushes piston 98 against brake 70. An intermediate position releases both brakes.

One way brake 66 is a passive coupler which allows the first carrier 26 and fourth ring gear 54 to rotate freely in a positive direction but prevents rotation in the opposite direction.

Torque converter assembly 80 comprises an impeller 82, stator 86, and turbine 84. Impeller 82 is driven by transmission input shaft 10. The stator 86 is connected to the transmission case 14 by one way brake 88. Torque is transmitted from the impeller to the turbine hydro-dynamically by fluid that circulates among the three elements. When the turbine is substantially slower than the impeller, one way brake 88 holds the stator stationary and it provides a reaction torque to create torque multiplication between the impeller and turbine. The one way brake overruns when the turbine speed is near or greater than the impeller speed. Hydraulically actuated lock-up clutch 90 connects the turbine to the impeller eliminating the hydro-dynamic losses of the torque converter. Careful design of the hydraulic system can reduce leakage of fluid from the torque converter sufficiently to allow idle engine shutdown for periods of several minutes, which exceeds the requirement for realizing the majority of the fuel saving benefits.

The transmission ratio is selected by applying two of the clutches and brakes as indicated in FIG. 3. In first gear, however, it is only necessary to apply one friction brake because one way brake 66 will engage passively.

When the vehicle is stationary in drive (forward) mode, the engine will generally be off, unless the idle stop feature of the control strategy is temporarily disabled for some reason, such as a drained torque converter, low coolant temperature, etc. The transmission is prepared for forward motion in first gear by rotating motor 96 to apply brake 68. When the driver signals that he is ready to move, the engine is quickly started. Of course, if the idle stop feature has been disabled, the engine will already be running, so this step can be skipped. The engine drives impeller 82, and hydro-dynamic forces within the torque converter generate torque on turbine 84 and gearbox input shaft 16. Brake 68 and one way brake 66 provide a reaction torque such that a multiple of the input torque is transferred to output shaft 12, accelerating the vehicle.

To shift to second gear, motor 94 is used to progressively engage brake 64, maintaining brake 68 in the fully applied state. As the torque capacity of brake 64 increases, one way brake 66 will overrun.

The engine driven hydraulic pump begins building up pressure in the valve body shortly after the engine is started. By the time the vehicle is ready to shift to third gear, hydraulic pressure is available. To shift from second to third gear, clutch 60 is progressively engaged while brake 64 is progressively released. To shift from third to fourth gear, clutch 62 is progressively engaged while clutch 60 is progressively released. Brake 68 is maintained in the fully applied state through all of these transitions. It is advantageous to apply lock-up clutch 90 soon after hydraulic pressure is available in order to minimize the energy loss associated with an open torque converter.

To shift from fourth to fifth gear, clutch 60 is progressively engaged while brake 68 is progressively released. Fifth gear is a direct drive gear. To shift from fifth to sixth gear, brake 64 is progressively engaged while clutch 60 is progressively released. To shift from sixth to seventh gear, brake 70 is progressively engaged while brake 64 is progressively released. Clutch 62 is maintained in the fully applied state through all of these transitions.

Eighth gear provides improved fuel economy for high speed driving. Unfortunately, it is not possible to shift directly from seventh gear to eighth gear without interrupting the flow of power through the transmission. There are two ways to get into eighth gear. The first method is to release clutch 62 and brake 70 then apply clutch 60 and brake 64. Engine torque must be interrupted during this transition because the transmission is not capable of transmitting torque to the wheels. The second method is to bypass seventh gear and shift from sixth gear into eighth gear by progressively engaging clutch 60 while progressively releasing clutch 62, maintaining brake 64 is the applied state.

Downshifting to a lower gear is accomplished by reversing the steps described above for the corresponding upshift.

The transmission is also capable of operation with an idle engine stop strategy in reverse. The transmission is prepared for reverse motion by rotating motors 92 and 96 to apply brakes 64 and 70, respectively. When the driver signals his intent to move, the engine is quickly started. The engine drives impeller 82, and hydro-dynamic forces within the torque converter generate torque on turbine 84 and gearbox input shaft 16. Brakes 64 and 70 provide a reaction torque such that a multiple of the input torque, in the opposite direction of the input torque, is transferred to output shaft 12, accelerating the vehicle.

Although brakes 64, 70 and 68 are all preferably electro-mechanically controlled, the invention can be practiced, with some functional limitations, with hydraulic actuation for these clutches. Specifically, if either brake 64 or brake 70 are hydraulically actuated, the idle engine stop feature would not be available in reverse. Furthermore, if brake 64 is hydraulically actuated, then the shift from first gear to second gear could not be initiated until the engine driven hydraulic pump has had time to produce sufficient pressure in the valve body.

Also, the invention may be practiced without torque converter 80 by driveably connecting gearbox input shaft 16 to transmission input shaft 10, preferably via a torsional damper. In this alternative embodiment, a forward vehicle launch is accomplished by the gradual engagement of brake 68. All shifts are accomplished in the manner described above. A vehicle launch in reverse is accomplished by fully engaging either brake 70 or brake 64 and then gradually engaging the other one.

Optionally, one way brake 66 may be omitted and its function accomplished by brake 70. If one way brake 66 is omitted, however, brakes 68 and 70 would need to be operated together in first gear, and would therefore require independent actuation.

Figure 4:
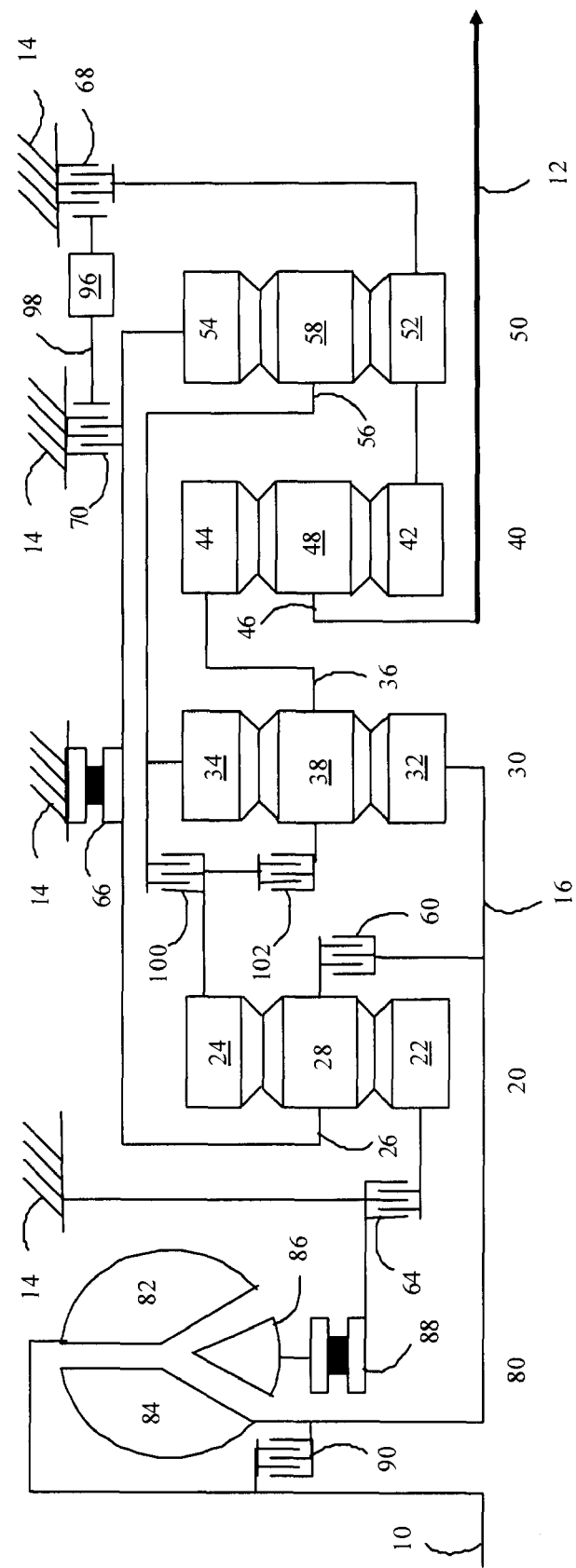
FIG. 4 is a schematic diagrams of an alternative embodiment of the present invention having three brakes and three rotating clutches.

A transmission according to a second embodiment of the present invention is illustrated in FIG. 4. The transmission contains four simple planetary gear set assemblies 20, 30, 40, and 50. Gearbox input shaft 16 is driven by the vehicle's engine via torque converter assembly 80. The second sun gear 32 is fixed to gearbox input shaft 16. The first carrier 26 is connected to the fourth ring gear 54. The third sun gear 42 is connected to the fourth sun gear 52. The second carrier 36 is connected to the third ring gear 44. A gearbox output shaft 12 drives the vehicle wheels, preferably via a driveshaft, a differential assembly, and rear axle shafts. Gearbox output shaft 12 is fixed to the third carrier 46. A transmission case 14 provides support for the gear sets, input shaft, and output shaft.

Clutches 60, 100, and 102 are preferably hydraulically actuated friction clutches which releasably connect two elements when hydraulic pressure is applied and disconnect those elements when the hydraulic pressure is released. Clutch 60 releasably connects gearbox input shaft 16 to the first carrier 26 and fourth ring gear 54. Clutch 100 releasably connects the first ring gear 24 to the second ring gear 34 and fourth carrier 56. Clutch 102 releasably connects the first ring gear 24 to the second carrier 36 and third ring gear 44.

Brakes 68 and 70 are preferably electro-mechanically actuated friction brakes which hold an element against rotation in response to the rotation of an electric motor and release said element when the electric motor is rotated in the opposite direction. Brake 68 releasably holds the third sun gear 42 and fourth sun gear 52 against rotation. Brake 70 releasably holds the first carrier 26 and fourth ring gear 54 against rotation. Brakes 68 and 70 are applied by motor 96 and piston 98. Rotating motor 96 in one direction pushes piston 98 against brake 68 and rotating it in the opposite direction pushes piston 98 against brake 70. An intermediate position releases both brakes.

Brake 64 releasably holds the first sun gear 22 against rotation. Brake 64 may be either electro-mechanically actuated or hydraulically actuated.

One way brake 66 is a passive coupler which allows the first carrier 26 and fourth ring gear 54 to rotate freely in a positive direction but prevents rotation in the opposite direction.

The transmission ratio is selected by applying three of the clutches and brakes as indicated in FIG. 5. An X in parenthesis indicates that the clutch is ordinarily applied in that gear but does not carry any torque. In first gear, it is only necessary to apply one friction brake because one way brake 66 will engage passively and clutch 102 is not required to establish the power path.

When the vehicle is stationary in drive (forward) mode, the transmission is prepared for forward motion in first gear by rotating motor 96 to apply brake 68. When the driver. signals that he is ready to move, the engine is quickly started. The engine drives impeller 82, and hydro-dynamic forces within the torque converter generate torque on turbine 84 and gearbox input shaft 16. Brake 68 and one way brake 66 provide a reaction torque such that a multiple of the input torque is transferred to output shaft 12, accelerating the vehicle.

The engine driven hydraulic pump begins building up pressure in the valve body shortly after the engine is started. By the time the vehicle is ready to shift to second gear, hydraulic pressure is available. Clutch 102 is engaged as soon as hydraulic pressure becomes available. To shift to second gear, brake 64 is progressively engaged, maintaining brake 68 and clutch 102 in the fully applied state. As the torque capacity of brake 64 increases, one way brake 66 will overrun. It is advantageous to apply lock-up clutch 90 soon after hydraulic pressure is available in order to minimize the energy loss associated with an open torque converter.

To shift from second to third gear, clutch 60 is progressively engaged while brake 64 is progressively released. To shift from third to fourth gear, clutch 100 is progressively engaged while clutch 60 is progressively released. Brake 68 and clutch 102 are maintained in the fully applied state through all of these transitions.

To shift from fourth to fifth gear, clutch 60 is progressively engaged while brake 68 is progressively released. Fifth gear is a direct drive gear. To shift from fifth to sixth gear, brake 64 is progressively engaged while clutch 60 is progressively released. Clutch 100 and clutch 102 are maintained in the fully applied state through these transitions.

To shift from sixth to seventh gear, clutch 60 is progressively engaged while clutch 102 is progressively released, maintaining clutch 100 and brake 64 fully engaged. To shift from seventh to eighth gear, clutch 102 is progressively engaged while clutch 100 is progressively released, maintaining clutch 60 and brake 64 fully engaged. All shifts may be performed without interrupting the power flow.

An additional gear ratio, which falls between seventh and eighth, is available by applying brake 70, clutch 100, and clutch 102. However, it is not possible to shift into this ratio from either seventh gear or eighth gear without interrupting the flow of power. A shift from sixth gear into this supplemental ratio is accomplished by progressively engaging brake 70 while progressively releasing brake 64, maintaining clutch 100 and clutch 102 fully engaged. The control strategy may elect to utilize this extra ratio instead of seventh and eighth gear in circumstances where the regular eighth gear is too deep of an overdrive, such as when towing a heavy trailer.

Downshifting to a lower gear is accomplished by reversing the steps described above for the corresponding upshift.

When the vehicle is stationary in reverse mode, the transmission is prepared for reverse motion by applying clutch 102, brake 64, and brake 70. The engine must be running in order to supply hydraulic pressure to clutch 102. The engine drives impeller 82, and hydro-dynamic forces within the torque converter generate torque on turbine 84 and gearbox input shaft 16. Brakes 64 and 70 provide a reaction torque such that a multiple of the input torque, in the opposite direction of input torque, is transferred to output shaft 12, accelerating the vehicle.

As with the first embodiment, the invention may be practiced according to the second embodiment, with some functional limitations, without the one way brake or the torque converter or with all hydraulic actuation.

In accordance with the provisions of the patent statutes, the structure and operation of the preferred embodiment has been described. A number of variations have also been suggested. However, it should be noted that alternate embodiments can be practiced otherwise than as specifically illustrated and described.

What is claimed is:

1. A multiple speed power transmission, comprising:
 a gearbox input shaft;
 an output shaft; and
 a collection of gears, friction brakes, clutches, and passive couplers capable of transmitting power from the gearbox input shaft to the output shaft with multiple forward speed ratios and at least one reverse speed ratio and wherein the first forward speed ratio is selected by engaging exactly one brake using an electro-mechanical actuator; the collection of gears, friction brakes, clutches, and passive couplers comprising
 first, second, and third epicyclic gearing assemblies each comprising first, second, and third rotating elements, wherein:
  the first rotating element of the second epicyclic gearing assembly is fixedly connected to the first rotating element of the third epicyclic gearing assembly;
  the third rotating element of the first epicyclic gearing assembly is fixedly connected to the second rotating element of the third epicyclic gearing assembly;
  the second rotating element of the first epicyclic gearing assembly is fixedly connected to the third rotating element of the second epicyclic gearing assembly;
  the gearbox input shaft is fixedly connected to the first rotating element of the first epicyclic gearing assembly; and
  the output shaft is driveably connected to the second rotating element of the second epicyclic gearing assembly;
 a one way brake which precludes the third rotating element of the third epicyclic gearing assembly from rotating in a negative direction while allowing said element to rotate in a positive direction, and
 an electro-mechanically actuated first friction brake for selectively holding against rotation the first rotating element of the second epicyclic gearing assembly and the first rotating element of the third epicyclic gearing assembly.

2. The multiple speed power transmission of claim 1, wherein the collection of gears, friction brakes, clutches, and one way brakes further comprise
 a fourth epicyclic gearing assembly comprising first, second, and third rotating elements, wherein the second rotating element of the fourth epicyclic gearing assembly is fixedly connected to the third rotating element of the third epicyclic gearing assembly;
 a second friction brake for selectively holding against rotation the first rotating element of the fourth epicyclic gearing assembly;
 a third friction brake for selectively holding against rotation the second rotating element of the fourth epicyclic gearing assembly and the third rotating element of the third epicylic gearing assembly; and a first clutch releasably connecting gearbox input shaft to the second rotating element of the fourth epicyclic gearing assembly and the third rotating element of the third epicyclic gearing assembly.

3. The multiple speed power transmission of claim 2, wherein the third friction brake is electro-mechanically actuated.

4. The multiple speed power transmission of claim 3, wherein the second friction brake is electro-mechanically actuated.

5. The multiple speed power transmission of claim 3, wherein a single electric motor actuates both the first friction brake and the third friction brake.

6. The multiple speed power transmission of claim 4, further comprising
  a fixed connection between the third rotating element of the fourth epicyclic gearing assembly and the second rotating element of the first epicyclic gearing assembly; and
  a second clutch releasably connecting two of the rotating elements of the first epicyclic gearing assembly to each other.

7. The multiple speed power transmission of claim 2, further comprising
  a second clutch releasably connecting the third rotating element of the fourth epicyclic gearing assembly to the third rotating element of the first epicyclic gearing assembly and the second rotating element of the third epicyclic gearing assembly; and
  a third clutch releasably connecting the third rotating element of the fourth epicyclic gearing assembly to the second rotating element of the first epicyclic gearing assembly and the third rotating element of the second epicyclic gearing assembly.

8. A multiple speed power transmission, comprising:
  a gearbox input shaft;
  an output shaft; and
  a collection of gears, friction brakes, and clutches capable of transmitting power from the gearbox input shaft to the output shaft with multiple forward speed ratios and at least one reverse speed ratio and wherein the first forward speed ratio is selected by engaging two friction brakes using electro-mechanical actuators; the collection of gears, friction brakes, and clutches comprising
  first, second, and third epicylic gearing assemblies each comprising first, second, and third rotating elements, wherein:
    the first rotating element of the second epicyclic gearing assembly is fixedly connected to the first rotating element of the third epicyclic gearing assembly;
    the third rotating element of the first epicyclic gearing assembly is fixedly connected to the second rotating element of the third epicyclic gearing assembly;
    the second rotating element of the first epicyclic gearing assembly is fixedly connected to the third rotating element of the second epicyclic gearing assembly;
    the gearbox input shaft is fixedly connected to the first rotating element of the first epicyclic gearing assembly; and
    the output shaft is driveably connected to the second rotating element of the second epicyclic gearing assembly;
  an electro-mechanically actuated first friction brake for selectively holding against rotation the first rotating element of the second epicyclic gearing assembly and the first rotating element of the third epicyclic gearing assembly; and
  an electro-mechanically actuated second friction brake for selectively holding against rotation the third rotating element of the third epicyclic gearing assembly.

9. The multiple speed power transmission of claim 8, wherein the collection of gears, friction brakes, and clutches further comprise
  a fourth epicylic gearing assembly comprising first, second, and third rotating elements, wherein the second rotating element of the fourth epicyclic gearing assembly is fixedly connected to the third rotating element of the third epicyclic gearing assembly;
  a third friction brake for selectively holding against rotation the first rotating element of the fourth epicyclic gearing assembly; and
  a first clutch releasably connecting gearbox input shaft to the second rotating element of the fourth epicyclic gearing assembly and the third rotating element of the third epicyclic gearing assembly.

10. The multiple speed power transmission of claim 9, further comprising
  a fixed connection between the third rotating element of the fourth epicyclic gearing assembly and the second rotating element of the first epicyclic gearing assembly; and
  a second clutch releasably connecting two of the rotating elements of the first epicyclic gearing assembly to each other.

11. The multiple speed power transmission of claim 10, wherein the third friction brake is electro-mechanically actuated.

12. The multiple speed power transmission of claim 9, further comprising
  a second clutch releasably connecting the third rotating element of the fourth epicyclic gearing assembly to the third rotating element of the first epicyclic gearing assembly and the second rotating element of the third epicyclic gearing assembly; and
  a third clutch releasably connecting the third rotating element of the fourth epicyclic gearing assembly to the second rotating element of the first epicyclic gearing assembly and the third rotating element of the second epicyclic gearing assembly.

13. A multiple speed power transmission, comprising:
  first, second, third, and fourth epicylic gearing assemblies each comprising first, second, and third rotating elements, wherein:
    the second rotating element of the first epicyclic gearing assembly is fixedly connected to the third rotating element of the fourth epicyclic gearing assembly;
    the first rotating element of the third epicyclic gearing assembly is fixedly connected to the first rotating element of the fourth epicyclic gearing assembly;
    the third rotating element of the second epicyclic gearing assembly is fixedly connected to the second rotating element of the fourth epicyclic gearing assembly; and
    the second rotating element of the second epicyclic gearing assembly is fixedly connected to the third rotating element of the third epicyclic gearing assembly;
  a gearbox input shaft connected to the first rotating element of the second epicyclic gearing assembly; and
  an output shaft connected to the second rotating element of the third epicyclic gearing assembly.

14. The multiple speed power transmission of claim 13, further comprising a first clutch releasably connecting gearbox input shaft to the second rotating element of the first epicyclic gearing assembly and the third rotating element of the fourth epicyclic gearing assembly;

a first brake for selectively holding against rotation the first rotating element of the first epicyclic gearing assembly;

a second brake for selectively holding against rotation the second rotating element of the first epicyclic gearing assembly and the third rotating element of the fourth epicyclic gearing assembly, and a third brake for selectively holding against rotation the first rotating element of the third epicyclic gearing assembly and the first rotating element of the fourth epicyclic gearing assembly.

15. The multiple speed power transmission of claim 14, further comprising a fixed connection between the third rotating element of the first epicyclic gearing assembly and either the second rotating element of the second epicyclic gearing assembly or the third rotating element of the third epicyclic gearing assembly, and a second clutch releasably connecting two of the rotating elements of the second epicyclic gearing assembly to each other.

16. The multiple speed power transmission of claim 14, further comprising a second clutch releasably connecting the third rotating element of the first epicyclic gearing assembly to the third rotating element of the second epicyclic gearing assembly and the second rotating element of the fourth epicyclic gearing assembly; and a third clutch releasably connecting the third rotating element of the first epicyclic gearing assembly to the second rotating element of the second epicyclic gearing assembly and the third rotating element of the third epicyclic gearing assembly.

\* \* \* \* \*